United States Patent
Vadde Makkalla et al.

(10) Patent No.: US 11,122,007 B2
(45) Date of Patent: Sep. 14, 2021

(54) DATA ROUTING THROUGH A GATEWAY CLUSTER OF A WIDE AREA NETWORK

(71) Applicant: Hewlett Packard Enterprise Development LP, Houston, TX (US)

(72) Inventors: Krishna Nataraj Vadde Makkalla, Bangalore Karnataka (IN); Sanjay Kaniyoor Surendra Hegde, Bangalore Karnataka (IN); Manoj Kareti, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/939,475

(22) Filed: Jul. 27, 2020

(65) Prior Publication Data

US 2021/0036983 A1    Feb. 4, 2021

(30) Foreign Application Priority Data

Jul. 31, 2019    (IN) .............................. 201941031005

(51) Int. Cl.
*H04L 29/12* (2006.01)
*H04L 12/713* (2013.01)
*H04L 12/46* (2006.01)
*H04L 12/66* (2006.01)

(52) U.S. Cl.
CPC ...... *H04L 61/2015* (2013.01); *H04L 12/4641* (2013.01); *H04L 12/66* (2013.01); *H04L 45/586* (2013.01); *H04L 61/6022* (2013.01)

(58) Field of Classification Search
CPC . H04L 12/66; H04L 12/4641; H04L 12/4675; H04L 45/586; H04L 61/2015
See application file for complete search history.

(56) References Cited

U.S. PATENT DOCUMENTS

| 6,556,547 B1 | 4/2003 | Srikanth et al. |
| 9,049,106 B2 | 6/2015 | Regan et al. |
| 9,559,962 B2 | 1/2017 | Durrani et al. |

(Continued)

FOREIGN PATENT DOCUMENTS

CN     100484034 A    1/2007

OTHER PUBLICATIONS

A. Mohamed. "Current Trends in Using the Software-Defined WAN". Computer and Information Systems and Technologies, Kharkiv National University of Radio Electronics. April. (Year: 2019).*

(Continued)

*Primary Examiner* — John M Macilwinen
(74) *Attorney, Agent, or Firm* — Hewlett Packard Enterprise Patent Department

(57) ABSTRACT

An example includes a manager gateway of a gateway cluster, comprising processing circuitry and a memory including instructions that cause the gateway to generate a virtual IP address for each gateway of the gateway cluster. The instructions further cause the gateway to receive an indication that a client device has joined a LAN. The instructions further cause the gateway to determine an anchor gateway to which the client device is to be anchored. The instructions further cause the gateway to transmit a first message anchoring the client device to the anchor gateway. The instructions further cause the gateway to transmit a second message offering an address to the client device.

20 Claims, 4 Drawing Sheets

(56) References Cited

U.S. PATENT DOCUMENTS

2008/0071890 A1      3/2008   Meier et al.
2016/0080483 A1*     3/2016   Li .................. H04L 67/1008
                                                              709/226
2016/0248729 A1*     8/2016   Cui .................. H04W 36/08

OTHER PUBLICATIONS

T. Taleb, A. Ksentini and P. A. Frangoudis, "Follow-Me Cloud: When Cloud Services Follow Mobile Users," in IEEE Transactions on Cloud Computing, vol. 7, No. 2, pp. 369-382, Apr. 1-Jun. (Year: 2019).*
Cisco SD-WAN. Configuring VRRP. "https://sdwan-docs.cisco.com/Product_Documentation/Software_Features/SD-WAN_Release_16.3/02System_and_Interfaces/06Configuring_Network_Interfaces/Configuring_VRRP". pp. 1-6. August. (Year: 2017).*
T. Taleb, A. Ksentini. "On Efficient Data Anchor Point Selection in Distributed Mobile Networks". 2013 IEEE International Conference on Communications (ICC). 6289-6293. (Year: 2013).*
S. Pandita. "OpenFlow Based Load Balancing and Proposed Theory For Integration In VoIP Network". Purdue University Graduate School, pp. 1-63. December. (Year: 2013).*
S. Nadas. RFC 5798. "Virtual Router Redundancy Protocol (VRRP) Version 3 for IPv4 and IPv6", pp. 1-401. March. (Year: 2010).*
Juniper Networks, "Understanding and Implementing High Definition Videoconferencing," Dec. 2010, pp. 1-200, Retrieved from the Internet from Apr. 20, 2019 from URL: <juniper.net/assets/us/en/local/pdf/books/7100137-en.pdf>.
NE Routing and Forwarding, pp. 1-1, Retrieved from the Internet Apr. 20, 2019 from URL: <infocenter.alcatel-lucent.com/public/5620SAM120R7A/index.jsp?topic=%2FSAM_UG%2Fhtml%2Fsam_network.html>.

\* cited by examiner

DATA ROUTING THROUGH A GATEWAY CLUSTER OF A WIDE AREA NETWORK

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

In some WAN topologies, certain LANs benefit from multiple gateways being deployed in a cluster. The clustered gateways can eliminate a single point of failure and provide graceful failover if a gateway were to fail.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
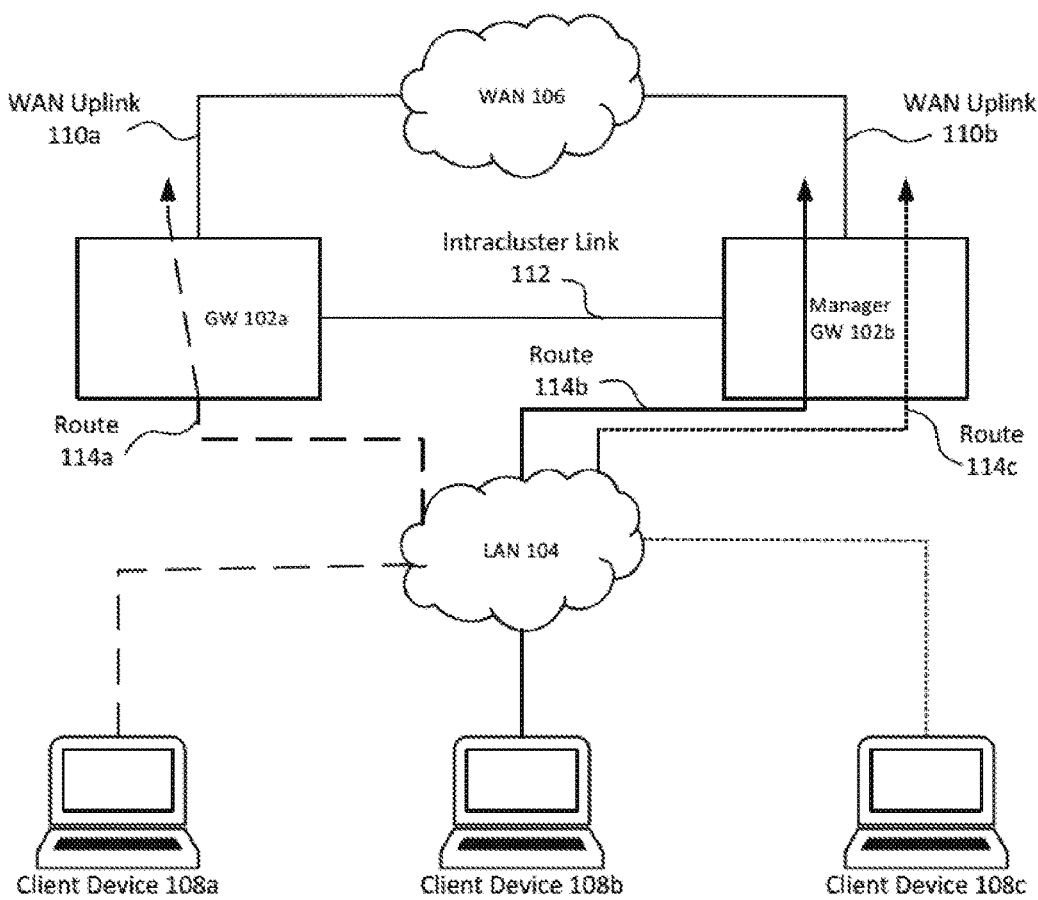
FIG. 1 illustrates an example software defined wide area network (SD-WAN) including a gateway cluster.

Certain examples have features that are in addition to or in lieu of the features illustrated in the above-referenced figures. Certain labels may be omitted from certain figures for the sake of clarity.

DETAILED DESCRIPTION

In a software defined wide area network (SD-WAN), a gateway cluster may be implemented for certain LANs for a number of reasons, such as smooth failover, shared load, additional WAN uplink support, etc. When clustered, gateways share responsibilities as distributed by a manager (or master) gateway. The manager gateway is elected by the cluster based on an election algorithm (e.g. lowest MAC address is manager), and the manager gateway assigns responsibilities to all of the gateways of the cluster, including itself.

One such responsibility is assignment of an anchor gateway (i.e. user anchor controller) to each client device of the LAN. When the manager gateway receives notice that a client device has joined the LAN, it consults a data structure (e.g. a bucketmap) to determine which gateway of the cluster to assign as anchor gateway for the client device. Once the anchoring is completed, the client device forwards data through the anchor gateway, often via a LAN-side tunnel.

In some examples, the manager gateway may also have the responsibility of being a dynamic host configuration protocol (DHCP) server for the LAN. The DHCP server provides an IP address to the client device, and provides the client device with routing information, including a gateway address. The client device forwards data traffic (e.g. IP packets) to the gateway address when the destination of the data traffic is not within the LAN.

Of note, the client device may not be directly connected to the anchor gateway, but may have one or more network infrastructure devices between itself and the anchor gateway. Conversely, the client device may be in the same LAN as another device, but required to route data traffic destined for the other device to the gateway address because the other device is on a different virtual local area network (VLAN) than the client device. A person having ordinary skill in the art would recognize that there are many permutations of network topology that may render certain portions of the generic description of the features in this disclosure slightly inaccurate. However, they would also recognize that such permutations do not impact the features themselves, but merely impact certain details of implementation.

In some other examples, a separate DHCP server may exist within the LAN, on a cloud device, or elsewhere on the WAN. The DHCP server similarly provides an IP address to the client device, and provides the client device with routing information, including a gateway address.

One limitation of clustered gateways in a SD-WAN is that the anchor gateway is not certain to be the same as the DHCP default gateway. If, for example, a client device is assigned GW1 as an anchor gateway and GW2 as a default gateway, traffic from the client device that is destined for the WAN would pass from client device to GW1 to GW2 to the WAN. The intracluster link between GW1 and GW2 may not be able to support the bandwidth requirements of multiple client devices at scale. Also, the default gateway or the anchor gateway may be improperly loaded at scale if the load balancing algorithm doesn't take both anchor gateway and default gateway into account when assigning a client device to a VLAN and to a default gateway.

Since each gateway includes one or more WAN uplinks, this issue can be resolved by assigning (by the manager gateway) a default gateway to the client device that matches the anchor gateway so that WAN data traffic does not pass through the intracluster links between gateways.

In examples where the manager gateway also functions as a DHCP server, the manager gateway generates virtual router redundancy protocol (VRRP) instances for each combination of gateways and VLANs in the LAN. For example, if a LAN has gateways GW1, GW2, and GW3, and VLANs VLAN1 and VLAN2, VRRP instances would be created for GW1-VLAN1, GW2-VLAN1, GW3-VLAN1, GW VLAN2, GW2-VLAN2, and GW3-VLAN2. Each VRRP instance include a virtual IP address (VIP) to address the VRRP group, as well as a master router (or gateway) and one or more standby routers (or gateways). The master router of a VRRP instance actively routes traffic that is routed to the VRRP instance's VIP. The standby routers are idle unless the master router fails. Thus, GW1-VLAN1 provides a default gateway through GW1 for devices in VLAN1.

By creating a VRRP instance for each GW-VLAN combination of the LAN, the manager gateway can assign each client device any gateway of the cluster as default gateway, no matter the client device's assigned VLAN. When the client device sends a DHCP Discover message across the network, the manager gateway constructs a DHCP Offer to include a default gateway corresponding to the client device's anchor gateway. If a client device is in VLAN2 and anchored to GW2, the manager gateway would construct a DHCP Offer including the VIP of GW2-VLAN2 in the Router option field (the field containing the default gateway, e.g, Option 3).

In examples where there is a separate DHCP server, the manager gateway does not generate the DHCP packets and thus cannot assign a default gateway in the same manner as when the manager gateway is also the DHCP server. Instead, the separate DHCP server assigns a default gateway without determining the client device's anchor gateway. The manager gateway, however, snoops packets (e.g. using deep packet inspection) to find certain DHCP packets (e.g. DHCP Offer, DF-ICP Ack) from the DHCP server to the client device. The manager gateway, upon finding such a DHCP packet, determines which VRRP instance should be used for the client device and modifies the DHCP packet to point to the VIP of the relevant VRRP instance as default gateway.

FIG. 1 illustrates an example software defined wide area network (SD-WAN) including a gateway cluster. SD-WAN 100 includes gateways (GWs) 102, LAN 104, WAN 106, client devices 108, WAN uplinks 110, intracluster link 112, and routes 114. GW 102a and Manager GW 102b are connected via intracluster link 112 to form a gateway cluster. GWs 102a and 102b each have a respective WAN uplink 110a and 110b to WAN 106. Client devices 108 connect through LAN 104 to GWs 102 via routes 114.

Manager GW 102b determines which VLANs are operating in LAN 104 and how many GWs are in the gateway cluster. Then, based on combinations of VLANs and GWs, Manager GW 102b generates VRRP instances for each VLAN-GW combination. For example, if LAN 104 includes two VLANs, VLAN1 including client devices 108a and 108c, and VLAN 2 including client device 108b, then Manager GW 102b generates four VRRP instances: VLAN1-GW102a, VLAN1-GW102b, VLAN2-GW102a, and VLAN2-GW102b. Each VRRP instance is used to assign client devices 108 to a default gateway, namely the VIP of the selected VRRP instance.

When a client device 108 joins LAN 104, Manager GW 102b may receive an indication in one of many ways. For example, Manager GW 102b may receive an address resolution protocol (ARP) message from a client device 108.

Manager GW 102b, upon detecting that the client device 108 has joined the LAN 104, determines, using a data structure, an anchor gateway (i.e. user anchor controller) based on identifying info of the client device 108, For example, if client device 108a broadcasts an ARP message to LAN 104 upon joining LAN 104, Manager GW 102b may determine client device 108a's MAC address from the ARP message and, using all or a portion of the MAC address, look up identifying information of an anchor gateway to assign to client device 108a from a bucketmap. In some examples, Manager GW 102b uses a VLAN assigned to client device 108a to select a bucketmap from a set of bucketmaps by VLAN and determines the anchor gateway based on a client device MAC address lookup of the appropriate VLAN bucketmap. For example, the bucketmap may anchor client device 108a to GW 102a. Client device 108a is anchored to GW 102a via a network link that forward data traffic. This data traffic link may be a tunnel, such as a user tunnel. The data traffic link may serve as the sole active connection between client device 108a and WAN 106. The client device 108 may also broadcast a DHCP Discover message. In some examples, the DHCP Discover message is sent prior to or concurrently to the anchoring being completed. In some other examples, the DF-ICP Discover message is sent after the anchoring is completed.

In examples where Manager GW 102b is a DHCP server, Manager GW 102b generates a DHCP Offer to send to client device 108a. In certain examples, Manager GW 102b is configured to determine the default gateway for client device 108a. Referring to the above, example, client device 108a, which is a member of VLAN1 and anchored to GW 102a is assigned the default gateway (a.k.a gateway address, router option) of the VIP of VRRP instance VLAN1-GW102a. Upon transmitting the DHCP Offer to client device 108a, Manager GW 102b has configured client device 108a to forward WAN-destined data traffic via route 114a and WAN traffic destined for client device 108a also follows route 114a. Route 114a may include traversing one or more tunnels, including a LAN tunnel between client device 108a and GW102a, and a WAN Uplink 110a tunnel between GW 102a and the data traffic's destination in WAN 106. As shown in FIG. 1, route 114a does not traverse intracluster link 112, and no other GW except for GW 102a handles WAN-destined data traffic for client device 108a.

Manager GW 102b may also anchor a standby GW (e.g. Manager GW 102b) to client device 108a for, among other reasons, failover purposes. In some examples, the standby GW is a backup router for the respective VRRP instance.

In examples where Manager GW 102b is not a DHCP server, Manager GW 102b may anchor a client device (e.g. client device 108a) to an anchor gateway as previously described, and the anchor gateway may forward the broadcast DHCP Discover message to a separate DHCP server. The DHCP server may not be aware of the gateway cluster or that client device 108b has been anchored to a gateway (e.g. GW 102a). As such, the DHCP server responds with a DHCP Offer that may or may not include a default gateway that is the same as the anchor gateway, and certainly does not include a default gateway that is the VIP of the appropriate VRRP instance. As the DHCP Offer is received at the anchor gateway (e.g. GW 102a), anchor GW 102a inspects the packet and determines that the default gateway needs to be changed. Anchor GW 102a then modifies the DHCP Offer by changing the default gateway to the VIP of the appropriate VRRP instance (e.g. VLAN1-GW102a) and transmitting the modified message to client device 108a. Then, similar to how previously described, WAN-destined data traffic from client device 108a follows route 114a, and likewise WAN traffic destined for client device 108a follows route 114a.

As shown in FIG. 1, client devices 108 are load balanced across gateways 102 according to load balancing algorithms of the anchoring process. For example, VLAN1 client devices (108a and 108c) are split across the two GWs 102, and client device 108b of VLAN2 is also assigned to GW 102*b*. Any pattern or organization of client devices to gateways is contemplated, using any appropriate data structure, such as one or more bucketmaps.

Figure 2:
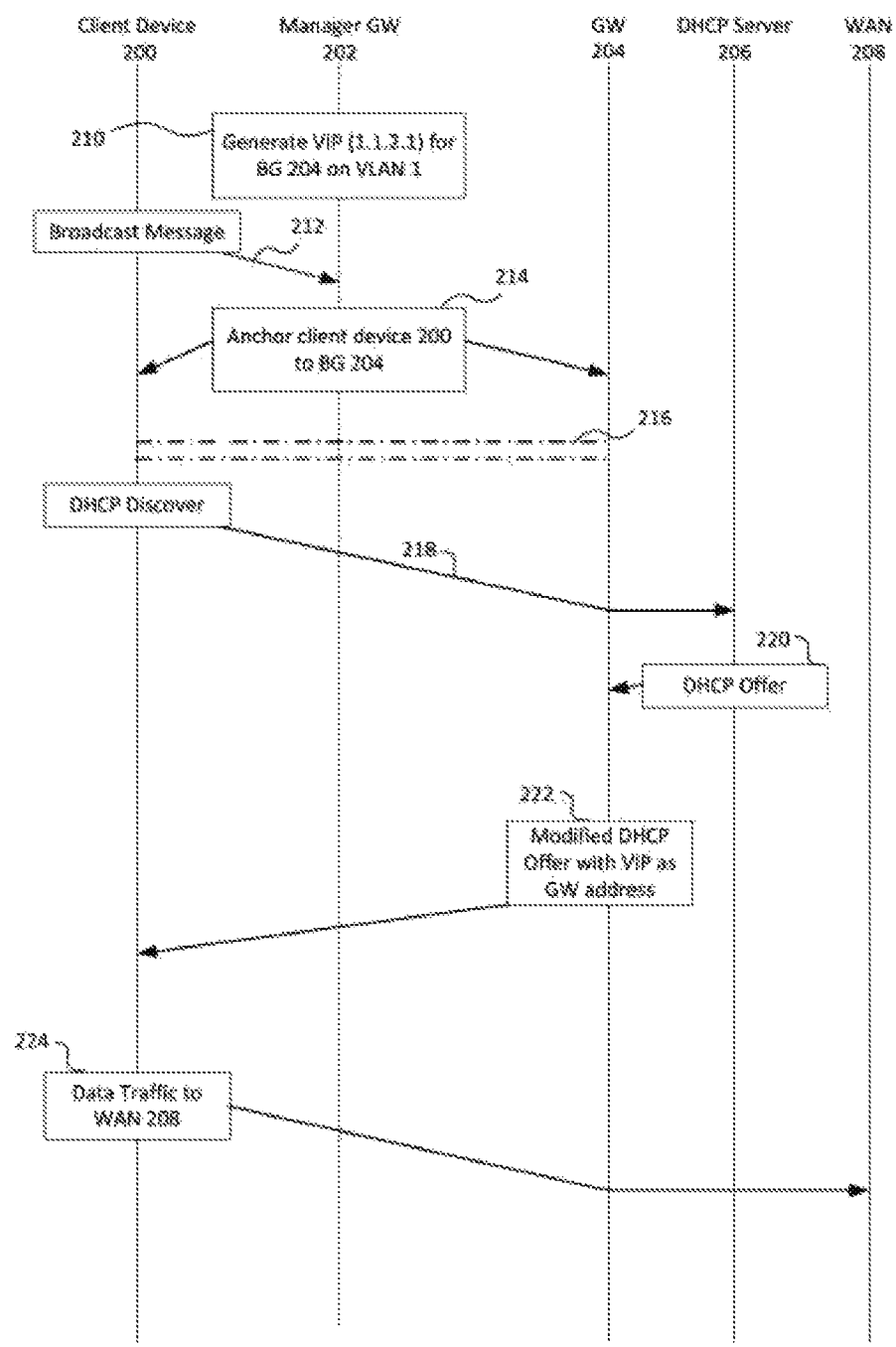
FIG. 2 is a signal flow chart illustrating an example initialization of a client device on an example SD-WAN.

FIG. 2 is a signal flow chart illustrating an example initialization of a client device on an example SD-WAN. The signal flow chart includes client device 200, manager GW 202, GW 204, DHCP Server 206, and WAN 208.

At block 210, Manager GW 202 generates a VRRP instance for VLAN1 and GW 204 including VIP 1.1.2.1. Additionally, Manager GW 202 generates VRRP instances for every combination of VLAN and GW in the LAN. In some examples, Manager GW 202 configures each VRRP instance so that the master router chosen for each VRRP instance corresponds to the GW in the VLAN-GW combination to which the VRRP instance is related.

Broadcast message 212 is an indication that client device 200 has joined the LAN. Broadcast message 212 may be an ARP message. Broadcast message 212 is transmitted from client device 200 and received at manager GW 202. In some examples, Broadcast message 212 is broadcast to the LAN, including Manager GW 202 and GW 204. Broadcast message 212 includes identifying information for client device 200, such as a MAC address. Manager GW 202 determines, using a data structure, such as one or more bucketmaps, an anchor gateway for client device 200 based, in part, on the identifying information for client device 200.

Signal 214 informs client device 200 and GW 204 that client device 200 is anchored to BG 204. In some examples, Manager GW 202 informs GW 204 of the anchoring assignment, and GW 204 establishes a connection 216 with client device 200. In other examples, Manager GW 202 informs both GW 204 and client device 200 of the anchoring assignment and assists in establishing connection 216 between client device 200 and GW 204. In some examples, connection 216 is a user tunnel that is formed between client device 200 and GW 204.

As shown in FIG. 2, DHCP Discover 218 is forwarded by anchor GW 204 to DHCP server 206. In some examples, DHCP server 206 processes Discover 218 simultaneously to Manager GW 202 anchoring client device 200, and DHCP server 206 transmits DHCP Offer 220 once Offer 220 is generated. DHCP server 206 generates DHCP Offer 220 including an IP address for client device 200 and a default gateway selected from the gateway cluster.

Anchor GW 204 snoops DHCP messages as they are received, and detects when a DHCP Offer or DHCP Ack is received from DHCP server 206. In some examples, Manager GW 202 snoops the DHCP messages instead of anchor GW 204. When Offer 220 is received, GW 204 determines that it is an Offer, and modifies the default gateway of Offer 220 to replace the existing default gateway inserted by DHCP server 206 with the appropriate VIP generated in block 210. Since client device 200 is in VLAN1 and anchored to GW 204, VRRP instance VLAN1-GW204's VIP, 1.1.2.1, is substituted into the Router option field (the default gateway field, e.g. Option 3) of DHCP Offer 220.

Anchor GW 204 then transmits the modified DHCP Offer 222 with the VIP as the default gateway address to client device 200. Since connection 216 was established as the anchor connection to client device 200, GW 204 routes modified DHCP Offer 222 through connection 216 to client device 200.

Once client device 200 receives modified DHCP Offer 222 and finishes the DHCP negotiation (not shown), client device 200 forwards data traffic 224 to WAN 208. Data traffic 224 follows tunnel 216 to GW 204, and since GW 204 is the master router of VIP 1.1.2.1, GW 204 forwards data traffic 224 to WAN 208. None of the WAN-destined data traffic 224 passes through an intracluster link of the gateway cluster. Likewise, traffic from WAN 208 destined to client device 200 is received at GW 204 by virtue of being routed to gateway address 1.1.2.1 (the VIP address of VLAN1-GW204), and GW 204 forwards the data traffic through connection 216 to client device 200.

Figure 3:
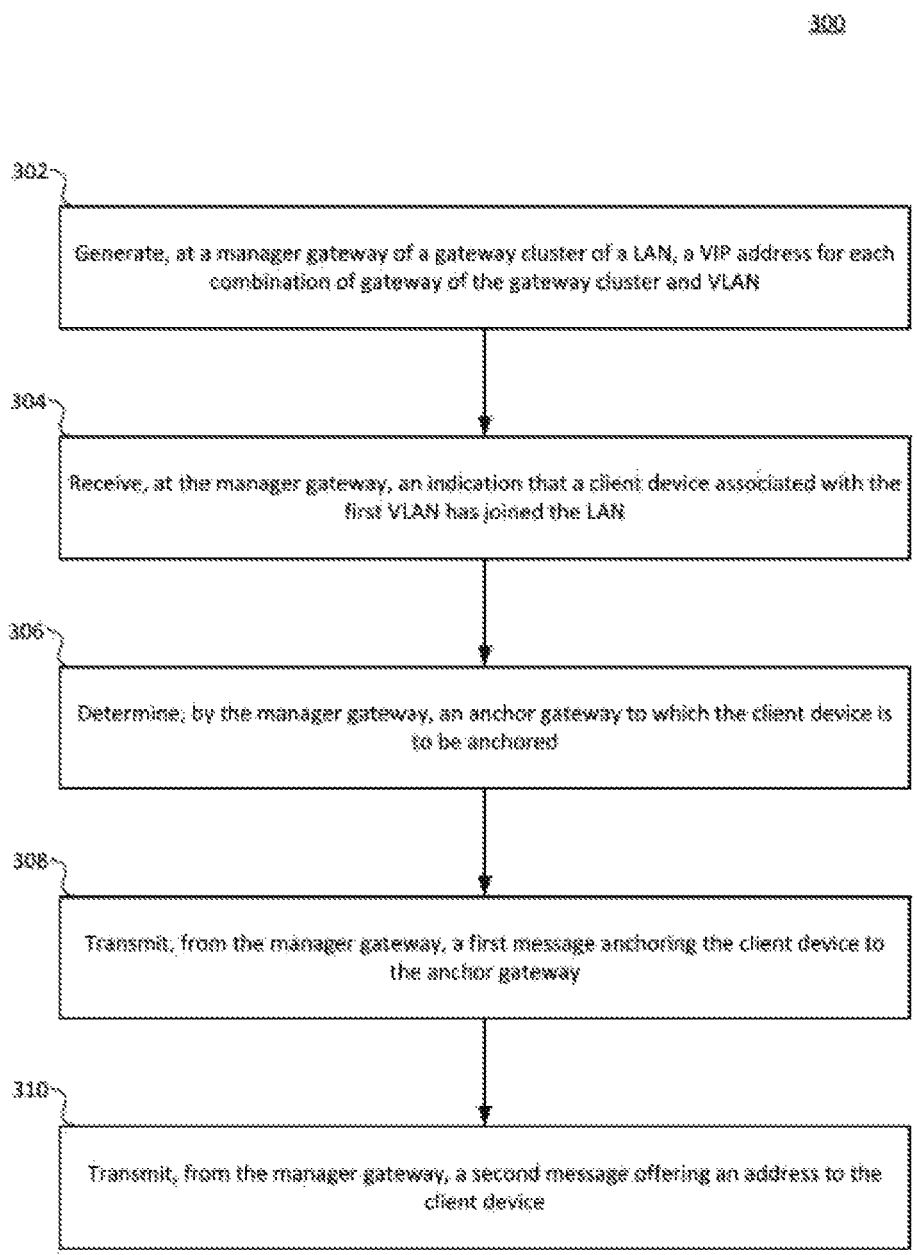
FIG. 3 is a flow chart illustrating an example method for initializing a client device on an example SD-WAN.

FIG. 3 is a flow chart illustrating an example method for initializing a client device on an example SD-WAN. Method 300 may be executed on a manager gateway of a gateway cluster of a LAN on a SD-WAN.

In block 302, A VIP address is generated at the manager gateway for each combination of gateway (of the gateway cluster) and VLAN. The VIP address may be a VIP of a VRRP instance that is associated with the GW-VLAN combination. The VRRP instance includes a master router (e.g. a gateway that actively routes traffic sent to the VIP address) and one or more standby routers (e.g. gateways that are idle with respect to traffic sent to the VIP address unless the master router fails).

In block 304, an indication is received at the manager gateway that a client device associated with the first ULAN has joined the LAN. In some examples, the indication is an ARP message including a client device MAC address. In certain examples, the manager gateway may associate the client device with a preliminary VLAN based on characteristics of the indication, location of the client device within the LAN, and previous network configuration.

In block 306, the manager gateway determines an anchor gateway to which the client device is to be anchored. In some examples, the manager gateway also determines a standby anchor gateway for, among other reasons, failover purposes. The anchor gateway may be determined by selecting a data structure (such as a bucketmap) corresponding to the VLAN of the client device and retrieving a gateway identifier corresponding to the anchor gateway from the data structure using identifying info of the client device (e.g. a MAC address) to look up the gateway identifier in the data structure.

In block 308, a first message is transmitted from the manager gateway anchoring the client device to the anchor gateway. In some examples, the first message is sent to the anchor gateway and the anchor gateway establishes a data traffic link with the client device. In some other examples, the first message (or variations thereof) is sent to both the anchor gateway and the client device, and the manager gateway facilitates the establishment of the data traffic link.

In block 310, a second message is transmitted from the manager gateway offering an address to the client device. In some examples, the manager gateway is also a DHCP server, and the second message is a DHCP Offer generated in response to a DHCP Discover message broadcast by the client device. The manager gateway, via the DHCP Offer, may assign an IP address to the client device and may configure the DHCP Offer such that the gateway address (a.k.a. default gateway, Router option field) for the client device corresponds to an address of the anchor gateway. More specifically, the gateway address may correspond to a VIP address of a VRRP instance with the anchor gateway configured as the master router. In some examples, the aforementioned standby anchor gateway may be configured as a backup router in the VRRP instance. Resultantly, data traffic from the client device to the WAN will transit through the anchor gateway and out a WAN uplink of the anchor gateway without passing through any other gateways of the gateway cluster or through any intracluster links of the gateway cluster. Likewise, data traffic from the WAN to the client device will transit through a WAN uplink of the anchor gateway, through the anchor gateway, and through the data traffic link between the anchor gateway and the client device without passing through any other gateways of the gateway cluster or through any intracluster links of the gateway cluster.

Figure 4:
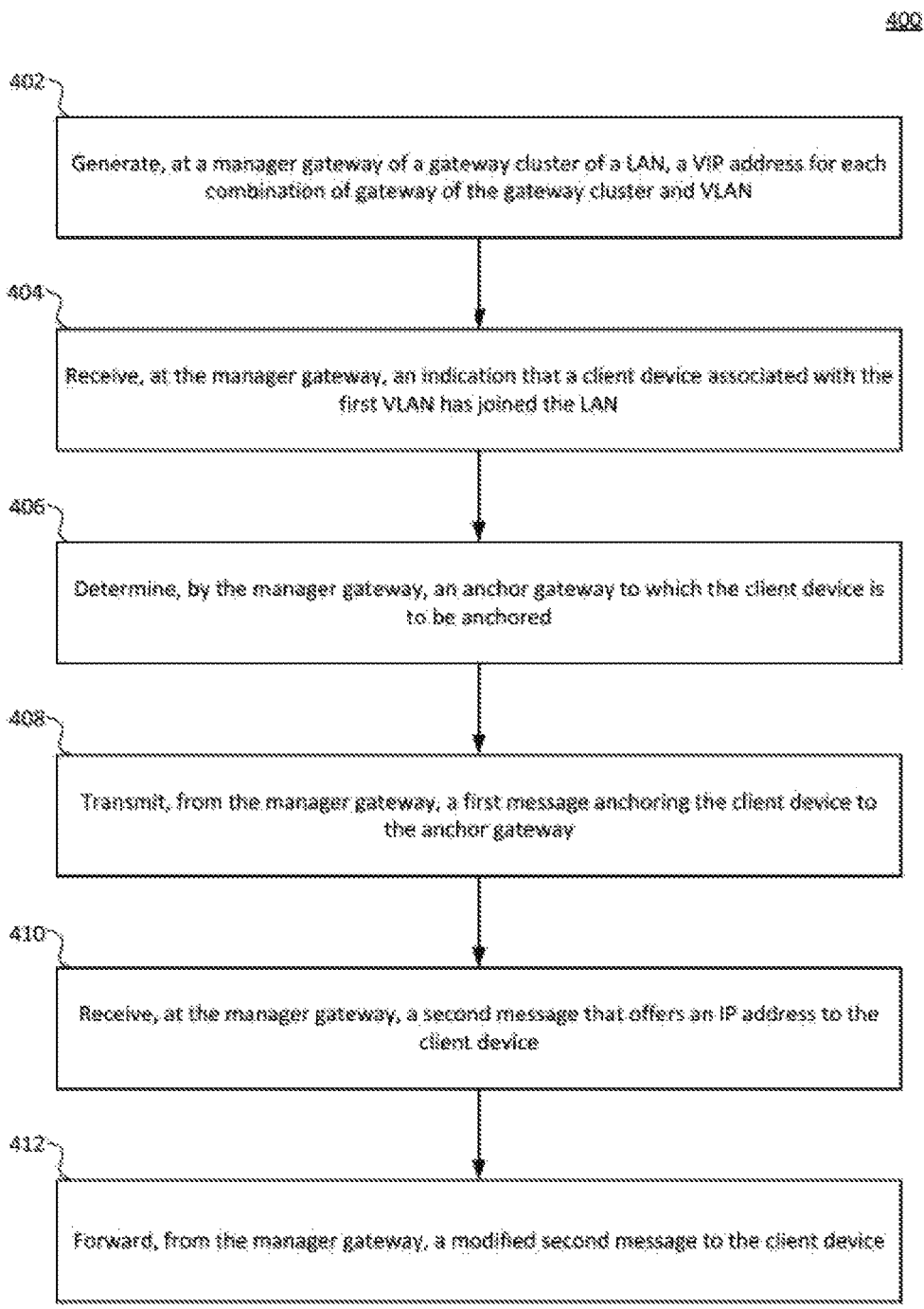
FIG. 4 is a flow chart illustrating another example method for initializing a client device on an example SD-WAN.

FIG. 4 is a flow chart illustrating another example method for initializing a client device on an example SD-WAN. Method 400 may be executed on a manager gateway of a gateway cluster of a LAN on a SD-WAN.

In block 402, A VIP address is generated at the manager gateway for each combination of gateway (of the gateway cluster) and VLAN. The VIP address may be a VIP of a VRRP instance that is associated with the GW-VLAN combination. The VRRP instance includes a master router (e.g. a gateway that actively routes traffic sent to the VIP address) and one or more standby routers (e.g. gateways that are idle with respect to traffic sent to the VIP address unless the master router fails).

In block 404, an indication is received at the manager gateway that a client device associated with the first VLAN has joined the LAN. In some examples, the indication is an ARP message including a client device MAC address. In certain examples, the manager gateway may associate the client device with a preliminary VLAN based on characteristics of the indication, location of the client device within the LAN, and previous network configuration.

In block 406, the manager gateway determines an anchor gateway to which the client device is to be anchored. In some examples, the manager gateway also determines a standby anchor gateway for, among other reasons, failover purposes. The anchor gateway may be determined by selecting a data structure (such as a bucketmap) corresponding to the VLAN of the client device and retrieving a gateway identifier corresponding to the anchor gateway from the data structure using identifying info of the client device (e.g. a MAC address) to look up the gateway identifier in the data structure.

In block 408, a first message is transmitted from the manager gateway anchoring the client device to the anchor gateway. In some examples, the first message is sent to the anchor gateway and the anchor gateway establishes a data traffic link with the client device. In some other examples, the first message (or variations thereof) is sent to both the anchor gateway and the client device, and the manager gateway facilitates the establishment of the data traffic link.

In block 410, a second message is received at the manager gateway offering an IP address to the client device. In some examples, the second message is a DHCP Offer message and the originating device of the second message is a separate DHCP server. The DHCP Offer message may be a response to a DHCP Discover message broadcast by the client device. The anchor gateway determines, via deep packet inspection or other snooping techniques, that a DHCP Offer or DHCP Ack message is received from the DHCP server and flags the message for further action. In some examples, the manager gateway may receive and snoop the DHCP Offer message rather than the anchor gateway. Unlike examples with an internal DHCP server on the manager gateway, the DHCP server does not have access to information about which gateway the client device is anchored to, nor is the DHCP server aware of the VRRP instances that have been created by the manager gateway in block 402. Therefore, the default gateway in the DHCP Offer message will not be the VIP address of the appropriate VRRP instance. The anchor gateway modifies the second message and additional DHCP messages from the DHCP server to insert the correct default gateway before forwarding to the client device in block 412.

In block 412, the modified second message is transmitted from the anchor gateway the client device. The anchor gateway, via the DHCP Offer, may configure the DHCP Offer such that the gateway address (a.k.a. default gateway, Router option field) for the client device corresponds to an address of the anchor gateway. More specifically, the gateway address may correspond to a VIP address of a VRRP instance with the anchor gateway configured as the master router. In some examples, the aforementioned standby anchor gateway may be configured as a backup router in the VRRP instance. Resultantly, data traffic from the client device to the WAN will transit through the anchor gateway and out a WAN uplink of the anchor gateway without passing through any other gateways of the gateway cluster or through any intracluster links of the gateway cluster. Likewise, data traffic from the WAN to the client device will transit through a WAN uplink of the anchor gateway, through the anchor gateway, and through the data traffic link between the anchor gateway and the client device without passing through any other gateways of the gateway cluster or through any intracluster links of the gateway cluster.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" encompass one or both of the classification of packets to a flow pattern, as well as the path those classified packets take through the SDN overlay network. "Routes" usually refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

Headend gateways (sometimes referred to as VPN concentrators) are network infrastructure devices that are placed at the edge of a core site LAN. Often headend gateways are routers that interface between the LAN and a wider network, whether it be directly to other LANs of the WAN via dedicated network links (e.g. MPLS) or to the other LANs of the WAN via the Internet through links provided by an Internet Service Provider connection. Many headend gateways can establish multiple uplinks to the WAN, both to multiple other LAN sites, and also redundant uplinks to a single other LAN site. Headend gateways also often include network controllers for the core site LAN. In such examples, a headend gateway in use in a SD-WAN may include a network controller that is logically partitioned from an included router. The network controller may control infrastructure devices of the core site LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A virtual local area network (VLAN) is a logical partition of a portion of a WAN. A VLAN may be contained within a certain LAN of the WAN or it may span across multiple LANs of the WAN. VLANs are implemented in layer 2 of the OSI model (the data link layer) and, among other benefits, improve network configurability as the size of the network scales. VLAN capable infrastructure devices may allocate VLANs on a per-port basis or may tag certain data frames with information associating the frames with their respective VLANs. VLANs may be used to group related devices, balance load on certain network infrastructure devices, apply security and routing policies on a broad basis, implement quality of service (QoS), etc.

A network infrastructure device is a device that receives network traffic and forwards the network traffic to a destination. Network infrastructure devices may include, among other devices, controllers, access points, switches, routers, bridges, and gateways. Certain network infrastructure devices may be SON capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

A software defined network (SDN) is a network overlaying a physical network that allows a device, such as a network orchestrator, to dynamically configure the topology of the SDN overlay using flows to specific routes through the underlay physical network. Dynamic configuration can include alterations to the network topology based on many factors, including network health and performance, data type, application type, quality of service restrictions (e.g. service level agreements), device load, available bandwidth, business cost, and other factors.

A software defined wide area network (SD-WAN) is a SDN that controls the interaction of various sites of a WAN. Each site may have one or more LANs, and LANs connect to one another via WAN uplinks. Some WAN uplinks are dedicated lines (e.g. MPLS), and others are shared routes through the Internet (e.g. DSL, T1, LTE, 5G, etc.). An SD-WAN dynamically configures the WAN uplinks and data traffic passing through the WAN uplinks to effectively use the resources of the WAN uplinks.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

We claim:

1. A manager gateway of a gateway cluster, comprising: processing circuitry; and
a memory including instructions that, when executed on the processing circuitry, cause the gateway to:
generate a virtual IP address for each gateway of the gateway cluster;
receive an indication that a client device has joined a local area network (LAN);
determine, based on a data structure, an anchor gateway to which the client device is to be anchored;
transmit a first message anchoring the client device to the anchor gateway, wherein anchoring the client device to the anchor gateway comprises establishing a data traffic link between the client device and the anchor gateway, and wherein data traffic forwarded between the gateway cluster and the client device is forwarded via the data traffic link; and
transmit a second message offering an address to the client device, wherein a gateway address of the second message is the virtual IP address for the anchor gateway, and wherein data traffic originating from the client device is forwarded to a wide area network (WAN) via a WAN uplink terminated at the anchor gateway.

2. The manager gateway of claim 1, wherein the generated virtual IP addresses are virtual IP addresses of virtual router redundancy protocol (VRRP) instances.

3. The manager gateway of claim 1, wherein the first message anchors the client device to a standby anchor gateway, and wherein the standby anchor gateway is a backup router in the VRRP instance associated with the gateway address of the second message.

4. The manager gateway of claim 1, wherein each gateway of the gateway cluster includes one or more WAN uplinks.

5. The manager gateway of claim 1, wherein the data structure is a bucketmap and the anchor gateway is determined using a MAC address of the client device to look up a controller identifier in the bucketmap.

6. The manager gateway of claim 5, wherein the second message is a DHCP Offer, and the manager gateway is a DHCP server.

7. A method, comprising:
generating, at a manager gateway of a gateway cluster of a local area network (LAN), a virtual IP address for each combination of gateway of the gateway cluster and virtual local area network (VLAN) of the LAN;
receiving, at the manager gateway, an indication that a client device associated with a first VLAN has joined the LAN;
determining, by the manager gateway, an anchor gateway to which the client device is to be anchored;
transmitting, from the manager gateway, a first message anchoring the client device to the anchor gateway, wherein anchoring the client device to the anchor gateway comprises establishing a data traffic tunnel between the client device and the anchor gateway, and wherein data traffic forwarded between the gateway cluster and the client device is forwarded via the data traffic tunnel; and
transmitting, from the manager gateway, a second message offering an address to the client device, wherein a gateway address of the second message corresponds to the virtual IP address for the combination of the anchor gateway and the first VLAN, and wherein data traffic originating from the client device is forwarded to a wide area network (WAN) via a WAN uplink terminated at the anchor gateway.

8. The method of claim 7, wherein determining the anchor gateway includes selecting a bucketmap corresponding to the first VLAN and retrieving a gateway identifier corresponding to the anchor gateway from the bucketmap using a MAC address of the client device.

9. The method of claim 7, wherein the second message is a DHCP Offer and the manager gateway is a DHCP server.

10. The method of claim 9, wherein the manager gateway assigns an IP address to the client device such that the gateway address of the client device corresponds to an address of the anchor gateway.

11. The method of claim 7, wherein the generated virtual IP addresses are virtual IP addresses of virtual router redundancy protocol (VRRP) instances.

12. The method of claim 11, wherein the first message anchors the client device to a standby anchor gateway, and wherein the standby anchor gateway is a backup router in the VRRP instance associated with the gateway address of the second message.

13. The method of claim 7, wherein each gateway of the gateway cluster includes one or more WAN uplinks.

14. A method, comprising:
generating, at a manager gateway of a gateway cluster of a local area network (LAN), a virtual IP address for each combination of gateway of the gateway cluster and virtual local area network (VLAN) of the LAN;
receiving, at a manager gateway of a gateway cluster, an indication that a client device associated with a first VLAN has joined the LAN;
determining, by the manager gateway, an anchor gateway to which the client device is to be anchored;
transmitting, from the manager gateway, a first message anchoring the client device to the anchor gateway, wherein anchoring the client device to the anchor gateway comprises establishing a data traffic tunnel between the client device and the anchor gateway, and wherein data traffic forwarded between the gateway cluster and the client device is forwarded via the data traffic tunnel;
receiving, at the manager gateway, a second message that offers an IP address to the client device, the second message including a gateway address corresponding to a gateway of the gateway cluster; and
forwarding, from the manager gateway, a modified second message to the client device, wherein the modified second message includes a gateway address corresponding to the virtual IP address for the combination of the anchor gateway and the first VLAN.

15. The method of claim 14, wherein the generated virtual IP addresses are virtual IP addresses of virtual router redundancy protocol (VRRP) instances.

16. The method of claim 15, wherein the first message anchors the client device to a standby anchor gateway, and wherein the standby anchor gateway is a backup router in the VRRP instance associated with the gateway address of the modified second message.

17. The method of claim 14, wherein each gateway of the gateway cluster includes one or more WAN uplinks.

18. The method of claim 14, wherein the second message is a DHCP Offer received from a DHCP server.

19. The method of claim 18, wherein the second message is determined to be a DHCP Offer by the manager gateway by deep packet inspection.

20. The method of claim 18, wherein additional DHCP messages from the DHCP server are detected and forwarded with modified gateway addresses.

* * * * *